(12) United States Patent
Lee et al.

(10) Patent No.: US 12,252,002 B2
(45) Date of Patent: Mar. 18, 2025

(54) COOLANT CONNECTION STRUCTURE FOR VEHICLE

(71) Applicants: Hyundai Motor Company, Seoul (KR); Kia Corporation, Seoul (KR)

(72) Inventors: Yoon Hyung Lee, Seongnam-Si (KR); Sang Shin Lee, Suwon-Si (KR); Byoung Hyun Ji, Goyang-Si (KR); Seong Min An, Seoul (KR); Gee Young Shin, Suwon-Si (KR); Dong Ho Kwon, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 295 days.

(21) Appl. No.: 17/830,812

(22) Filed: Jun. 2, 2022

(65) Prior Publication Data
US 2023/0025914 A1    Jan. 26, 2023

(30) Foreign Application Priority Data
Jul. 13, 2021  (KR) .................. 10-2021-0091402

(51) Int. Cl.
*F28F 9/00*   (2006.01)
*B60H 1/00*   (2006.01)
*B60K 11/02*  (2006.01)
*B60H 1/22*   (2006.01)

(52) U.S. Cl.
CPC .......... *B60K 11/02* (2013.01); *B60H 1/00528* (2013.01); *B60H 2001/00307* (2013.01); *B60H 2001/2278* (2013.01)

(58) Field of Classification Search
CPC ................ B60K 11/02; B60H 1/00528; B60H 2001/00307; B60H 2001/2278
USPC ......................................................... 165/41
See application file for complete search history.

(56) References Cited

U.S. PATENT DOCUMENTS

| | | |
|---|---|---|
| 2003/0038470 A1 | 2/2003 | Chernoff et al. |
| 2018/0056752 A1 | 3/2018 | Ogawa et al. |
| 2018/0200331 A1 | 7/2018 | Okeoma et al. |
| 2019/0366796 A1 | 12/2019 | Omori |

FOREIGN PATENT DOCUMENTS

| | | | |
|---|---|---|---|
| JP | 2004511747 A | * | 4/2004 |
| KR | 101375114 B1 | * | 3/2014 |
| KR | 10-2016-0041451 | | 4/2016 |

* cited by examiner

*Primary Examiner* — Davis D Hwu
(74) *Attorney, Agent, or Firm* — Morgan, Lewis & Bockius LLP

(57) ABSTRACT

A coolant connection structure includes an upper body fastened to an upper end portion of the vehicle, a lower body positioned at a lower end portion of the upper body, a floor panel formed between the upper body and the lower body, and a joint module positioned at the floor panel and fluidly connected to a coolant tank positioned at the lower body.

13 Claims, 4 Drawing Sheets

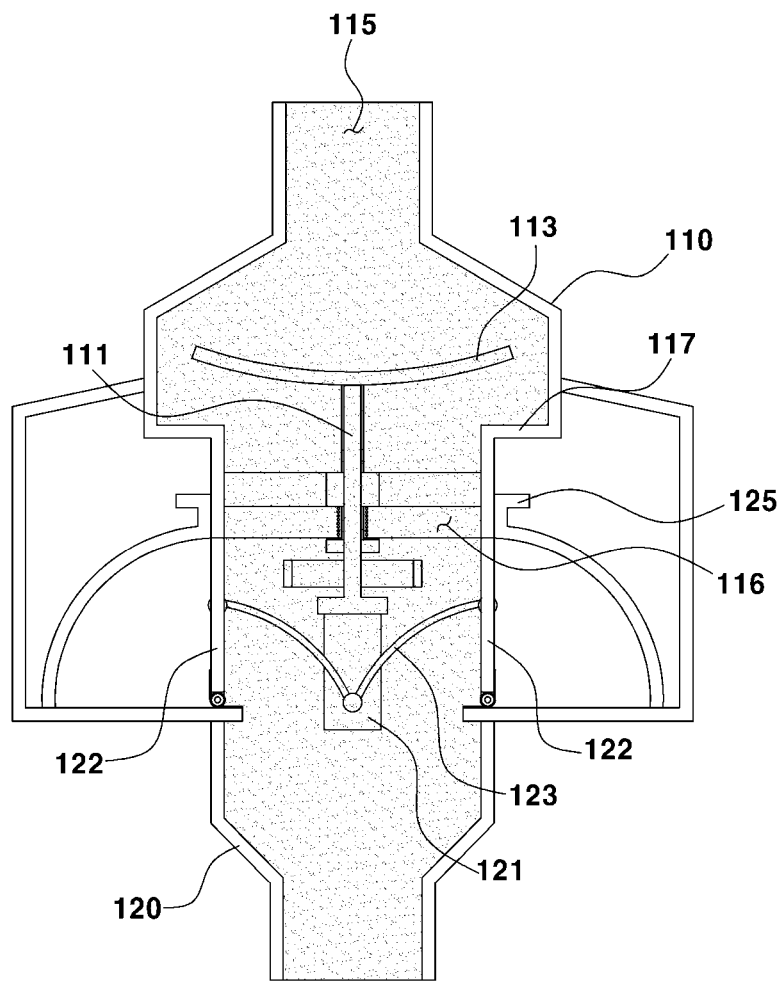

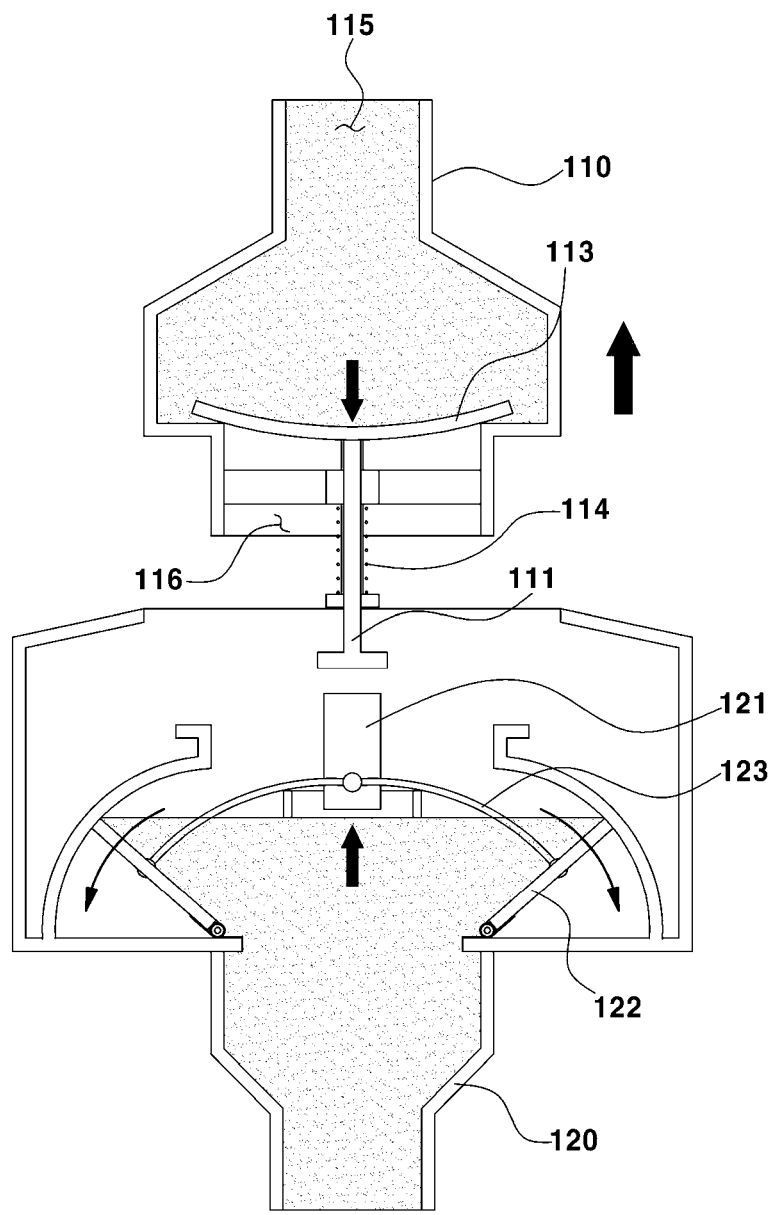

COOLANT CONNECTION STRUCTURE FOR VEHICLE

CROSS REFERENCE TO RELATED APPLICATION

The present application claims priority to Korean Patent Application No. 10-2021-0091402, filed Jul. 13, 2021, the entire contents of which is incorporated herein for all purposes by this reference.

BACKGROUND OF THE INVENTION

Field of the Invention

The present invention relates to a coolant connection structure for a vehicle. More particularly, the present disclosure relates to a coolant connection structure for a vehicle, which provides the coolant connection structure between an upper body and a lower body of a purpose-built vehicle in which the upper body and the lower body may be selectively fastened to each other, thus providing a coolant sealing structure for each separated body.

Description of Related Art

A vehicle may be divided into a lower body that forms a vehicle body and an upper body which is fastened to the lower body and includes a cabin in which a driver or a passenger may ride.

Moreover, the upper body including the cabin may define a space isolated from an outside, thus providing various types of spaces.

Furthermore, recently, a purpose-built vehicle is configured so that an upper body including various types of cabins may be fastened to one lower body, and thereby it is possible to reduce time and cost required to develop vehicles having different purposes.

However, the purpose-built vehicle essentially requires a fastening structure between various components positioned at the lower body and components positioned at the upper body. Furthermore, the purpose-built vehicle requires a separate fastening structure for making a fluid connection of coolant between the lower body and the upper body. Moreover, even in the case of including the separate fastening structure, the discharge and re-injection of the coolant are essentially required when the upper body and the lower body are disassembled and then re-assembled. That is, a separate coupling structure corresponding to a configuration requiring the fluid connection between the upper body and the lower body is needed.

The foregoing is intended merely to aid in the understanding of the background of the present invention, and is not intended to mean that the present invention falls within the purview of the related art which is already known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a joint module which makes a fluid connection of coolant between an upper body and a lower body of a purpose-built vehicle.

Furthermore, the present invention is directed to providing a coolant connection structure for a vehicle which prevents the leakage of coolant in a state where an upper body and a lower body of a purpose-built vehicle are separated from each other.

The present invention is not limited to the above-mentioned objective. Other objectives of the present invention may be evidently understood from the following description, and may be realized by means described in claims and combinations thereof.

To achieve the objectives of the present invention, a coolant connection structure for a vehicle includes the following configuration.

Various aspects of the present invention provide a coolant connection structure for a vehicle, the coolant connection structure including an upper body fastened to an upper end portion of the vehicle; a lower body positioned at a lower end portion of the upper body; a floor panel formed between the upper body and the lower body; and a joint module positioned at a hole of the floor panel, and fluidly connected to a coolant tank positioned at the lower body.

The joint module may include a lower housing fastened to face the lower body; an upper housing positioned at the upper body and fastened to the lower housing; a damper positioned in the lower housing to selectively contact with a lower end portion of the upper housing; and a rod fastened to the damper and selectively contacting with an extension member positioned at the upper housing to be integrally moved with the extension member.

The coolant connection structure may further include a link portion positioned between the damper and the rod and connecting the damper and the rod; and a lower elastic body connected to the damper and applying an elastic force to the damper such that the rod is positioned at an upper end portion of the lower housing.

When the upper housing is inserted into the lower housing, the rod may be moved to a lower end portion of the lower housing by the extension member.

When the rod is fastened to the extension member to be moved downwards, the damper may be moved to a position corresponding to the lower end portion of the upper housing.

The coolant connection structure may further include an upper door connected to an upper end portion of the extension member to selectively open or close the upper housing.

The coolant connection structure may further include a guide portion extending along a lower surface of the upper door; and an upper elastic body positioned at the guide portion and applying an elastic force to an upper end portion of the upper door in a height direction as the upper door moves downwards.

In a state where the upper housing is separated from the lower housing, the upper door may be switched to a closure state by coolant flowing from the upper body into the upper housing.

At least a portion of the joint module may be fluidly connected to an evaporator core positioned at the upper body.

At least a portion of the joint module may be fluidly connected to a heater core positioned at the upper body.

The coolant connection structure may further include a protrusion positioned at the upper housing; and a locking portion positioned at the lower housing so that the protrusion is held on the locking portion.

The present invention may obtain the following effect by a combination of the above-described embodiment and a configuration that will be described below, and a use relationship thereof.

A coolant connection structure for a vehicle according to various exemplary embodiments of the present invention is advantageous in that an upper body structure, which may be selectively fastened without the leakage of coolant, is provided, thus giving a user a wide range of choices.

Furthermore, a coolant connection structure for a vehicle according to various exemplary embodiments of the present invention is advantageous in that it is possible to prevent the leakage of coolant when an upper body and a lower body are fastened to each other, thus reducing a separate process for replenishing coolant when the upper body is re-provided.

Moreover, it is advantageous in that it is possible to flexibly increase the number of joint modules if necessary without modifying components according to the specification of a heat control circuit of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 illustrates a coupling relationship of a joint module in a state where an upper body and a lower body are fastened to each other, according to various exemplary embodiments of the present invention; and FIG. 5 illustrates a structure of the joint module in a state where the upper body and the lower body are released from each other, according to various exemplary embodiments of the present invention.

Figure 1:
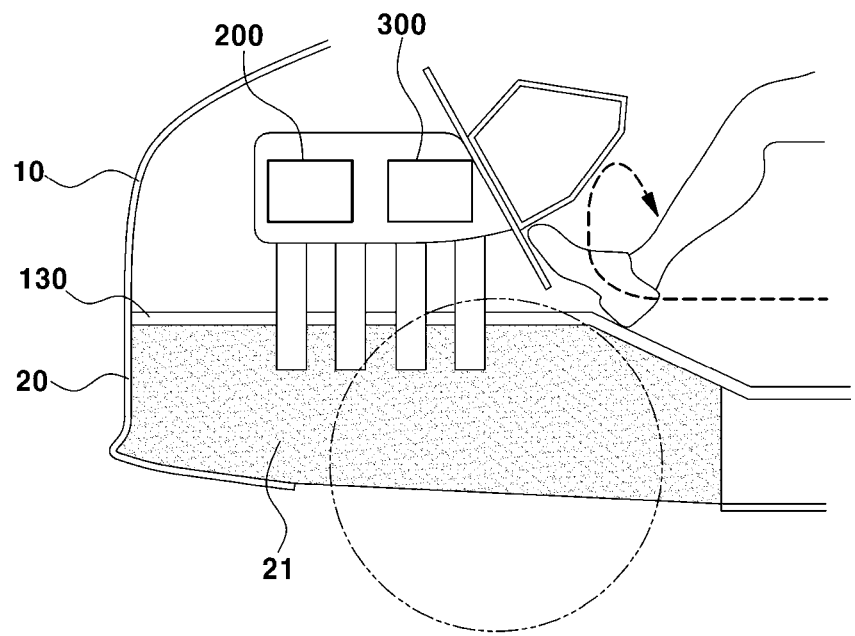
FIG. 1 is a side view exemplarily illustrating a vehicle including a coolant connection structure for a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to the accompanying drawings. The exemplary embodiment of the present invention may be changed in various ways, and the scope of the present invention may not be construed as being limited to the following embodiments. The present exemplary embodiment makes those skilled in the art more fully understand the present invention.

Furthermore, terms of "body", "housing", and "module" described herein mean a unit that processes at least one function or operation. This may be implemented in hardware, software, or a combination of hardware and software.

When various exemplary embodiments of the present invention are described in detail with reference to the accompanying drawings, like reference numerals refer to like parts throughout various figures and embodiments of the present invention.

The present invention is directed to a coolant connection structure for a vehicle positioned at an upper body 10 and a lower body 20 that form a purpose-built vehicle. The upper body 10 includes various types of cabins to be fastened to the lower body 20.

The lower body 20 refers to a portion of the vehicle positioned under a floor panel 130. The lower body 20 may include an in-wheel motor as a driving portion of a vehicle body and a battery that applies power to the in-wheel motor. Alternatively, the lower body 20 may include the driving portion of an internal combustion engine. This may be interpreted as a concept including a configuration for providing a driving force to the vehicle.

The upper body 10 includes a boarding space or load space of the vehicle, and is configured to be fastened to the lower body 20. The upper body 10 and the lower body 20 may be fastened to each other, and a means for fastening the upper and lower bodies is not limited.

FIG. 1 is a side view exemplarily illustrating a vehicle including a coolant connection structure for a vehicle according to various exemplary embodiments of the present invention.

The floor panel 130 may be provided between the lower body 20 and the upper body 10, and at least one joint module 100 may be provided to pass through the floor panel 130. An opening 140 may be formed in the floor panel 130 to fix the joint module 100.

Furthermore, to prevent the opening from being open to an outside in a state where the upper body 10 is released, the opening 140 may be closed by a cover. When a fluid connection is not required in a state where the upper body 10 and the lower body 20 are fastened, the opening 140 may be kept closed.

A coolant tank 21 may be provided in the lower body 20 to store coolant, and may be fluidly connected to a heater core 200 and/or an evaporator 300 positioned in the upper body 10.

The floor panel 130 may be located between the upper body 10 and the lower body 20, and may be secured to the lower body 20. The floor panel 130 may include the opening 140 corresponding to the joint module 100, and may be configured so that the coolant is fluidly connected between the upper body 10 and the lower body 20 through the opening 140.

Furthermore, the joint module 100 in various exemplary embodiments of the present invention may be expanded or reduced according to a specification of the upper body 10 fastened to the lower body 20. Thus, the number of joint modules 100 may be selected in consideration of the heat control of the upper body 10.

Figure 2:
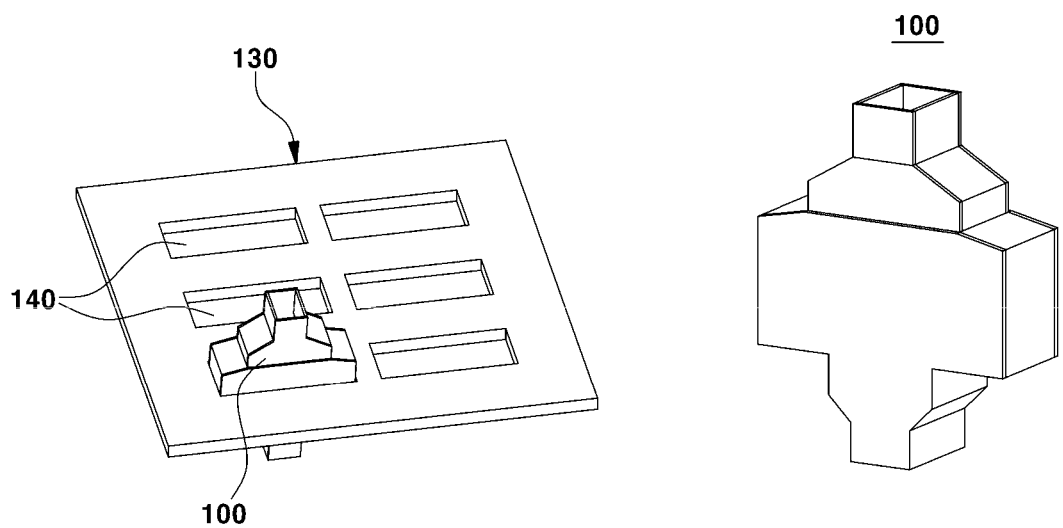
FIG. 2 illustrates the coolant connection structure for the vehicle and a floor panel according to various exemplary embodiments of the present invention.

As shown in FIG. 2, the present invention may include six joint modules 100, and may be configured so that a fluid connection between the heater core 200 or the evaporator 300 positioned in the upper body 10 and the coolant tank 21 of the lower body 20 is made through the joint modules 100.

Each joint module 100 may be fixedly positioned in the opening 140 formed in the floor panel 130, and a lower housing 120 of the joint module 100 may be fixedly fastened to the opening 140 of the floor panel 130.

The upper housing 110 and the lower housing 120 may be configured to define a coolant path therein, and a lower hole 116 of the upper housing 110 may be selectively opened through an upper door 113. A lower end portion of the upper housing 110 may be inserted into an upper end portion of the lower housing 120, and a protrusion 117 of the upper housing 110 may be configured to correspond to a locking portion 125 formed in the lower housing 120.

Figure 3:
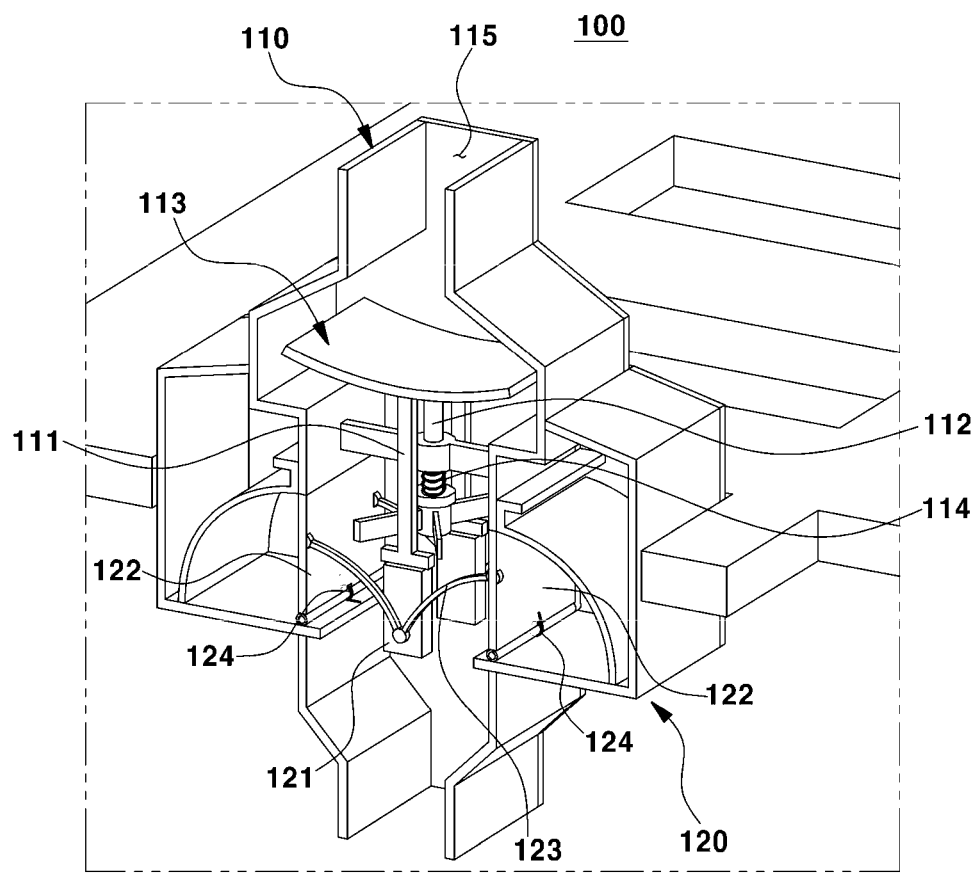
FIG. 3 is an enlarged view exemplarily illustrating a joint module of the coolant connection structure for the vehicle according to various exemplary embodiments of the present invention.

FIG. 3 illustrates the coupling relationship of the joint module 100 according to various exemplary embodiments of the present invention.

The joint module 100 includes the lower housing 120 positioned at the floor panel 130, and the upper housing 110 which is at least partially inserted into an upper end portion of the lower housing 120. The lower housing 120 includes a rod 121 configured to face an extension member 111 positioned at the upper housing 110, dampers 122 provided on both side surfaces of the lower housing 120, and link portions 123 positioned between the rod 121 and the dampers 122. The link portions 123 are positioned between the rod 121 and the dampers 122, so that the dampers 122 provided on an internal surface of the lower housing 120 are rotatably moved to contact both side surfaces of the upper housing 110, as the rod 121 is fastened to the extension member 111 and then moved in a height direction thereof. In other words, the dampers 122 are configured to rotate about a rotation shaft fastened to the lower housing 120 in response to the movement of the rod 121 in the height direction thereof. For instance, when the rod 121 moves downwards, the damper comes into contact with the lower end portion of the upper housing 110. When the rod 121 moves upwards, the rod is rotated at a position adjacent to an outside of the lower housing 120.

Moreover, the rotation shaft about which the dampers 122 are rotated may include lower elastic bodies 124 that apply an elastic force to cause the dampers 122 to rotate to both side surfaces of the lower housing 120. Therefore, in a state where the upper body 10 and the lower body 20 are released from each other, the dampers 122 positioned in the lower housing 120 receive the elastic force such that an end portion of the dampers 122 is rotated to a position adjacent to the external surface of the lower housing 120. Thus, the rod 121 fastened to the dampers 122 via the link portion 123 is moved upwards in the height direction thereof.

The link portions 123 are positioned between the dampers 122 and the rod 121, and has a predetermined curvature. Thus, as the rod 121 moves in the height direction, the dampers 122 are rotated about a portion of the lower housing 120. Therefore, as the rod 121 is fastened to the extension member 111 and then is moved in the height direction, the end portion of the dampers 122 is rotated about the rotation shaft fastened to the inside of the lower housing 120.

The upper end portion of the upper housing 110 may be fluidly connected to the heater core 200 or the evaporator 300, and an upper door 113 may be provided in the upper housing 110 to selectively close an upper hole 115 and a lower hole 116 of the upper housing 110. The upper door 113 may move in the height direction of the upper housing 110 to selectively close the lower hole 116.

The extension member 111 is configured to extend downwards along a lower surface of the upper door 113, and an end portion of the extension member 111 is provided on a position corresponding to the rod 121 positioned at the lower housing 120. Therefore, when the upper housing 110 is inserted into the lower housing 120, the extension member 111 is in contact with an upper end portion of the rod 121 to move the rod 121 downwards.

A guide portion 112 positioned along the lower surface of the upper door 113 adjacent to the extension member 111 includes an upper elastic body 114. Moreover, the upper elastic body 114 is configured to apply an elastic force in a direction where the upper door 113 moves, when the upper door 113 moves downwards.

The upper door 113 and the upper elastic body 114 may be configured so that the upper door 113 is moved downwards by the coolant introduced into the upper housing 110 in a state where the upper body 10 is separated from the lower body 20, and the lower hole 116 is closed by the upper door 113. That is, the elastic force of the upper elastic body 114 positioned at the lower end portion of the upper door 113 is configured to be smaller than pressure applied to the upper door 113 by the coolant.

FIG. 4 is a side sectional view exemplarily illustrating a coupling relationship between the upper housing 110 and the lower housing 120 of the joint module 100 in a state where the upper body 10 and the lower body 20 are fastened to each other, according to various exemplary embodiments of the present invention.

In a state where the upper body 10 and the lower body 20 are fastened to each other, the lower end portion of the upper housing 110 is at least partially inserted into the lower housing 120. At least one protrusion 117 may be provided on the external surface of the upper housing 110, and the protrusion 117 may be fastened to the locking portion 125 positioned at the lower housing 120 to set a height at which the upper housing 110 is inserted into the lower housing 120.

Moreover, the extension member 111 is in contact with the rod 121 positioned in the lower housing 120 to move integrally with the rod, and the dampers 122 fastened to the rod 121 via the link portions 123 are rotated about the lower end portion of the lower housing 120 to a position corresponding to the lower end portion of the upper housing 110.

The dampers 122 and the locking portion 125 positioned at the lower housing 120 are configured to control an insertion amount into which the upper housing 110 is inserted. Thus, only a portion of the lower end portion of the upper housing 110 is inserted into the lower housing 120.

In other words, the rod 121 positioned in the lower housing 120 moves downwards, and the dampers 122 fastened to the downwardly moved rod 121 is moved to a position corresponding to the lower end portion of the upper housing 110. Thus, a height at which the upper housing 110 is inserted into the lower housing 120 is controlled.

When the upper housing 110 is inserted into the lower housing 120, the lower elastic body 124 positioned at the rotation shaft of the dampers 122 is switched to a compressed state. Therefore, when the upper housing 110 is separated from the lower housing 120, the lower elastic body 124 applies an elastic force such that the dampers 122 are rotated to both side surfaces inside the lower housing 120, and thereby the rod 121 moves upwards in the height direction thereof.

The upper door 113 positioned at the upper housing 110 is located between the upper hole 115 and the lower hole 116, so coolant flows through both side surfaces of the upper door 113. Moreover, the upper elastic body 114 may be positioned in the compressed state.

FIG. 5 is a side sectional view exemplarily illustrating the upper housing 110 and the lower housing 120 in a state where the upper body 10 and the lower body 20 are separated from each other, according to various exemplary embodiments of the present invention.

When the upper body 10 is separated from the lower body 20, the upper housing 110 fixedly positioned at the upper body 10 is unfastened from the lower housing 120. Moreover, the extension member 111 positioned at the upper housing 110 is unfastened from the rod 121 positioned at the lower housing 120. The rod 121 is integrally moved by the dampers 122 which are connected through the link portion 123. In a direction where the dampers 122 are rotated along the internal surface of the lower housing 120, the end portion of the dampers 122 distant from the rotation shaft is rotated by the lower elastic body 124 fastened to the rotation shaft of the damper 122. Moreover, the rod 121 fastened to the dampers 122 via the link portion 123 moves upwards in the height direction thereof.

The upper door 113 positioned at the upper housing 110 is configured to cover the lower hole 116 of the upper housing 110 depending on the pressure of coolant introduced into the upper body 10. The upper door 113 is configured to close the lower hole 116 by the pressure of the coolant positioned at the upper body 10.

Therefore, to prevent the coolant positioned in the upper body 10 from being discharged in the state where the upper body 10 is separated from the lower body 20, the upper body 10 may be switched to a closed state through the upper door 113. Moreover, when the upper door 113 is switched to a position contacting with the lower hole 116, the upper elastic body 114 positioned at the guide portion 112 is compressed. However, the upper elastic body 114 may have a low elastic force as compared to the pressure of the coolant applied to the upper door 113.

Moreover, a separate cover may be provided on the upper end portion of the lower housing 120 exposed to the lower body 20, thus preventing the leakage of coolant.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coolant connection structure for a vehicle, the coolant connection structure comprising:
   an upper body fastened to an upper end portion of the vehicle;
   a lower body positioned at a lower end portion of the upper body;
   a floor panel formed between the upper body and the lower body; and
   a joint module positioned at a hole of the floor panel, and fluidly connected to a coolant tank positioned at the lower body,
   wherein the upper body and the lower body are selectively fastened to each other.

2. The coolant connection structure of claim 1, wherein the joint module includes:
   a lower housing fastened to face the lower body;
   an upper housing positioned at the upper body and fastened to the lower housing;
   a damper positioned in the lower housing to selectively contact with a lower end portion of the upper housing; and
   a rod fastened to the damper and selectively contacting with an extension member positioned at the upper housing to be integrally moved with the extension member.

3. The coolant connection structure of claim 2, further including:
   a link portion positioned between the damper and the rod and connecting the damper and the rod; and
   a lower elastic body connected to the damper and applying an elastic force to the damper.

4. The coolant connection structure of claim 3, wherein the rod is positioned at an upper end portion of the lower housing.

5. The coolant connection structure of claim 3, wherein the link portion has a predetermined curvature so that when the rod moves in a height direction, the damper is rotated about a portion of the lower housing.

6. The coolant connection structure of claim 3, wherein, when the upper housing is inserted into the lower housing, the rod is moved to a lower end portion of the lower housing by the extension member.

7. The coolant connection structure of claim 2, wherein, when the rod is fastened to the extension member to be moved downwards, the damper is moved to a position corresponding to the lower end portion of the upper housing.

8. The coolant connection structure of claim 2, further including:
   an upper door connected to an upper end portion of the extension member to selectively open or close the upper housing.

9. The coolant connection structure of claim 8, further including:
   a guide portion extending along a lower surface of the upper door; and
   an upper elastic body positioned at the guide portion, and applying an elastic force to an upper end portion of the upper door in a height direction as the upper door moves downwards.

10. The coolant connection structure of claim 8, wherein, in a state where the upper housing is separated from the lower housing, the upper door is switched to a closure state by coolant flowing from the upper body into the upper housing.

11. The coolant connection structure of claim 1, wherein at least a portion of the joint module is fluidly connected to an evaporator core positioned at the upper body.

12. The coolant connection structure of claim 1, wherein at least a portion of the joint module is fluidly connected to a heater core positioned at the upper body.

13. The coolant connection structure of claim 2, further including:
   a protrusion positioned at the upper housing; and
   a locking portion positioned at the lower housing so that the protrusion is held on the locking portion.

\* \* \* \* \*